United States Patent
Ohira

(10) Patent No.: US 10,413,897 B2
(45) Date of Patent: Sep. 17, 2019

(54) ION EXCHANGER

(71) Applicant: TOYOTA BOSHOKU KABUSHIKI KAISHA, Aichi-ken (JP)

(72) Inventor: Junko Ohira, Kariya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 23 days.

(21) Appl. No.: 15/647,737

(22) Filed: Jul. 12, 2017

(65) Prior Publication Data

US 2018/0056284 A1 Mar. 1, 2018

(30) Foreign Application Priority Data

Aug. 24, 2016 (JP) .................. 2016-163310

(51) Int. Cl.
*B01J 47/06* (2006.01)
*F28D 1/04* (2006.01)
(Continued)

(52) U.S. Cl.
CPC ............ *B01J 47/06* (2013.01); *B01J 47/022* (2013.01); *F28D 1/0408* (2013.01); *F28F 19/00* (2013.01);
(Continued)

(58) Field of Classification Search
CPC ...... B01D 15/14; B01D 15/361; B01J 47/022; B01J 47/06; F28D 1/0408;
(Continued)

(56) References Cited

U.S. PATENT DOCUMENTS 4,851,122 A * 7/1989 Stanley .................... B01J 39/04
210/501
2006/0102331 A1* 5/2006 Taras ................... F28D 1/05366
165/174

(Continued)

FOREIGN PATENT DOCUMENTS

| DE | 202016005457 U1 * | 10/2016 | ............ B01D 61/08 |
| JP | 2011009034 A * | 1/2011 | |
| JP | 2011-83744 | 4/2011 | |

OTHER PUBLICATIONS

JP2011083744 machine translation.*
DE 202016005457 U1 machine translation.*
JP-2011009034-A machine translation (Year: 2011).*

*Primary Examiner* — Keith M Raymond
*Assistant Examiner* — Gordon A Jones
(74) *Attorney, Agent, or Firm* — Greenblum & Bernstein, P.L.C.

(57) ABSTRACT

An ion exchanger includes a case and an ion exchange resin. The case includes an inflow hole into which a refrigerant flows and an outflow hole out of which the refrigerant flows. The ion exchange resin is arranged in the case to remove ions from the refrigerant. The inflow hole and the outflow hole are located at a lower end of the case. The case accommodates a tube extending in a vertical direction and connecting to the outflow hole. The ion exchange resin is located between an inner wall of the case and an outer wall of the tube. The inflow hole is formed so that the refrigerant flows through the inflow hole into the case and evenly into the ion exchange resin from a lower end surface of the ion exchange resin.

3 Claims, 6 Drawing Sheets

(51) Int. Cl.
*H01M 8/04029* (2016.01)
*F28F 19/00* (2006.01)
*H01M 8/04044* (2016.01)
*B01J 47/022* (2017.01)
*F28D 21/00* (2006.01)

(52) U.S. Cl.
CPC ... *H01M 8/04029* (2013.01); *H01M 8/04044* (2013.01); *F28D 2021/0043* (2013.01); *H01M 2250/20* (2013.01); *Y02T 90/32* (2013.01)

(58) Field of Classification Search
CPC ............ F28D 2021/0043; F28F 19/00; H01M 8/04029; H01M 8/04044; H01M 2250/20; Y02T 90/32
See application file for complete search history.

(56) References Cited

U.S. PATENT DOCUMENTS

| 2014/0183281 | A1* | 7/2014 | Iddir ...................... B01D 15/14 239/398 |
| 2017/0187050 | A1* | 6/2017 | Weissberger ..... H01M 8/04029 |
| 2017/0263953 | A1* | 9/2017 | Ohira ................... B01D 15/361 |

* cited by examiner

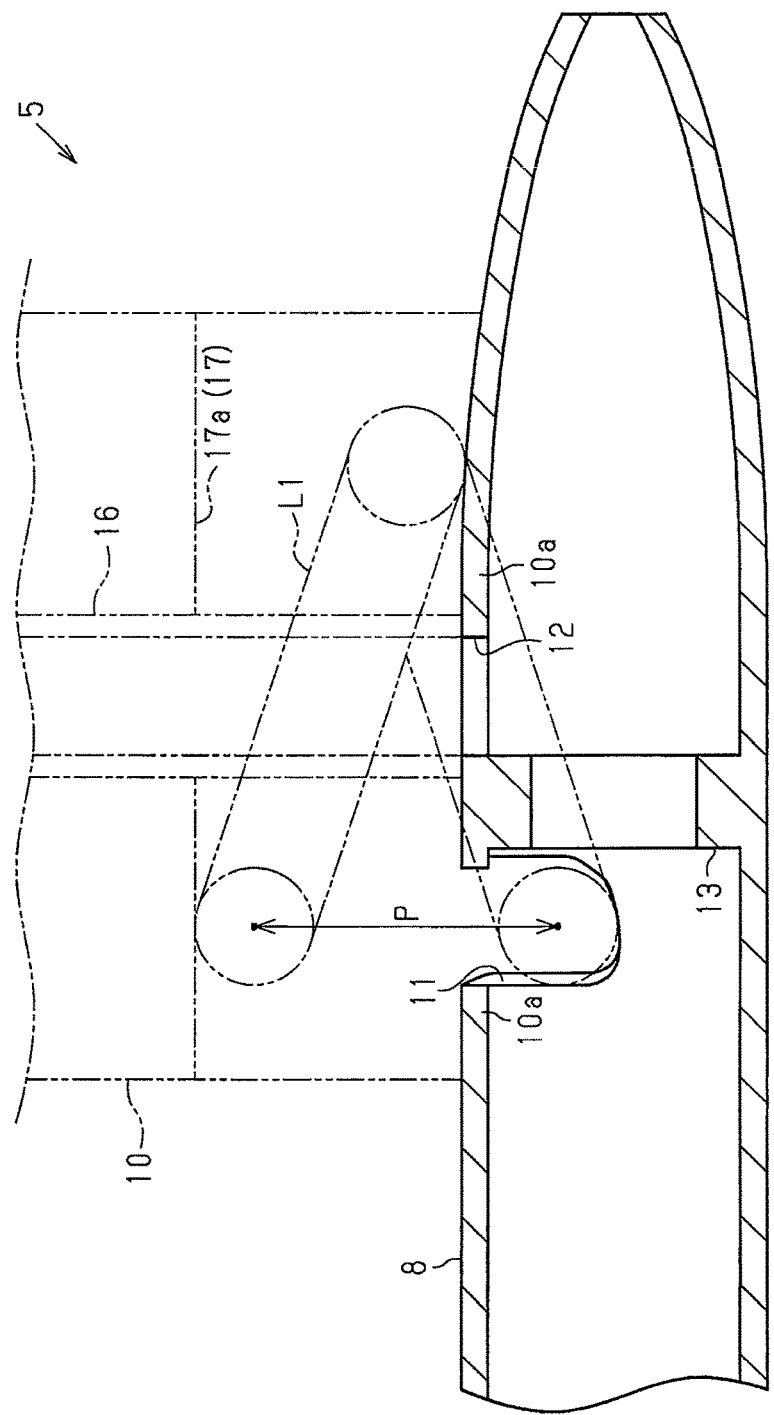

ION EXCHANGER

BACKGROUND OF THE INVENTION

The present invention relates to an ion exchanger.

When a fuel cell is installed in a vehicle or the like, the vehicle includes a cooling circuit through which a refrigerant that cools the fuel cell flows. The cooling circuit limits temperature increases of the battery cell when power is generated.

However, when ions are eluted from a pipe or the like to a refrigerant in the cooling circuit and ions are generated through the heating and decomposition of components in the refrigerant, the ions in the refrigerant flowing through the cooling circuit increases. This may cause metal erosion and lower the performance of the fuel cell. Thus, the cooling circuit includes an ion exchanger that adsorbs and removes ions from the refrigerant.

For example, Japanese Laid-Open Patent Publication No. 2011-83744 discloses an example of an ion exchanger known in the art. In the ion exchanger, an ion exchange resin is arranged in a case including an inflow hole and an outflow hole. When a refrigerant flows from the inflow hole into the case and passes through the ion exchange resin, the ion exchange resin removes ions from the refrigerant through ion exchange. After the ions are removed, the refrigerant flows out of the case through the outflow hole.

In the ion exchanger, the refrigerant in the case does not always evenly pass through the ion exchange resin, and the flow of the refrigerant may be biased when passing through the ion exchange resin. In such cases, the ion exchange resin cannot efficiently remove ions from the refrigerant. This will lower the efficiency for removing ions with the ion exchange resin in the ion exchanger.

SUMMARY OF THE INVENTION

It is an object of the present invention to provide an ion exchanger that limits decreases in the efficiency for removing ions with an ion exchange resin.

To achieve the above object, an ion exchanger according to one aspect of the present invention includes a case and an ion exchange resin. The case includes an inflow hole into which a refrigerant flows and an outflow hole out of which the refrigerant flows. The ion exchange resin is arranged in the case to remove ions from the refrigerant. The inflow hole and the outflow hole are located at a lower end of the case. The case accommodates a tube extending in a vertical direction and connecting to the outflow hole. The ion exchange resin is located between an inner wall of the case and an outer wall of the tube. The inflow hole is formed so that the refrigerant flows through the inflow hole into the case and evenly into the ion exchange resin from a lower end surface of the ion exchange resin.

In this structure, the refrigerant flows through the inflow hole into the case and evenly flows into the ion exchange resin from the lower end surface of the ion exchange resin. This limits a biased flow of the refrigerant that passes through the ion exchange resin. Thus, the ion exchange resin efficiently removes ions from the refrigerant. This limits decreases in the ion removal efficiency of the ion exchanger with the ion exchange resin that would be caused when the ion exchange resin does not efficiently remove ions from the refrigerant.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a cross-sectional side view showing an extension when hypothetically extending the inflow hole of FIG. 2 into the case;

DETAILED DESCRIPTION OF THE PREFERRED EMBODIMENTS

First Embodiment

A first embodiment of an ion exchanger will now be described with reference to FIGS. 1 to 7.

Figure 1:
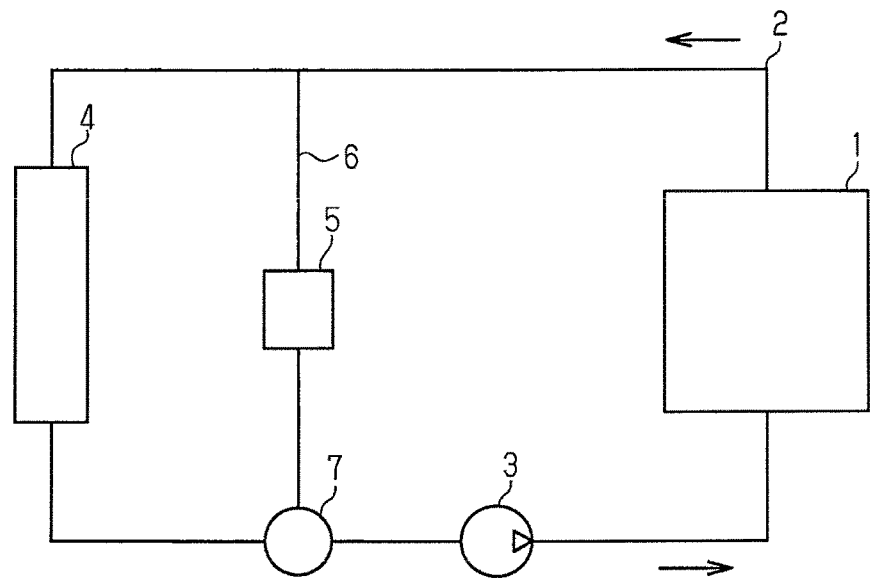
FIG. 1 is a diagram showing the entire structure of a cooling circuit including an ion exchanger according to one embodiment of the present invention.

As shown in FIG. 1, a vehicle in which a fuel cell 1 is installed includes a cooling circuit 2. A refrigerant that cools the fuel cell 1 flows through the cooling circuit 2. Coolant (long life coolant) containing ethylene glycol is used as such a refrigerant. In the cooling circuit 2, a pump 3 is driven to circulate the refrigerant.

In the cooling circuit 2, the fuel cell 1 is located at a downstream side of the pump 3. A radiator 4 is located at a downstream side of the fuel cell 1 and an upstream side of the pump 3. The fuel cell 1 that increases in temperature when generating power is cooled by the coolant, which circulates in the cooling circuit 2 and passes through the fuel cell 1. The refrigerant that draws heat from the fuel cell 1 and increases in temperature is cooled by air when passing through the radiator 4. Then, the refrigerant flows into the pump 3.

The cooling circuit 2 includes an ion exchanger 5, which removes ions from the refrigerant and a bypass pipe 6, through which the refrigerant flows to the ion exchanger 5. The ion exchanger 5 is located in the bypass pipe 6. One end of the bypass pipe 6 is connected to a portion of the cooling circuit 2 located at a downstream side of the fuel cell 1 and an upstream side of the radiator 4. The other end of the bypass pipe 6 is connected by a valve 7 to a portion of the cooling circuit 2 located at a downstream side of the radiator 4 and an upstream side of the pump 3.

The valve 7 selectively opens and closes and determines whether or not the refrigerant that passes through the fuel cell 1 flows into the bypass pipe 6 (ion exchanger 5). More specifically, when the valve 7 is closed, the refrigerant flows into the radiator 4 instead of the bypass pipe 6. When the valve 7 is open, some of the refrigerant that passes through the fuel cell 1 flows into the bypass pipe 6 instead of the radiator 4. Ions are removed from the refrigerant flowing into the bypass pipe 6 in such a manner when the refrigerant passes through the ion exchanger 5. Subsequently, the refrigerant flows into the portion of the cooling circuit 2 located at the downstream side of the radiator 4 and the upstream side of the pump 3.

The structure of the ion exchanger 5 will now be described.

Figure 2:
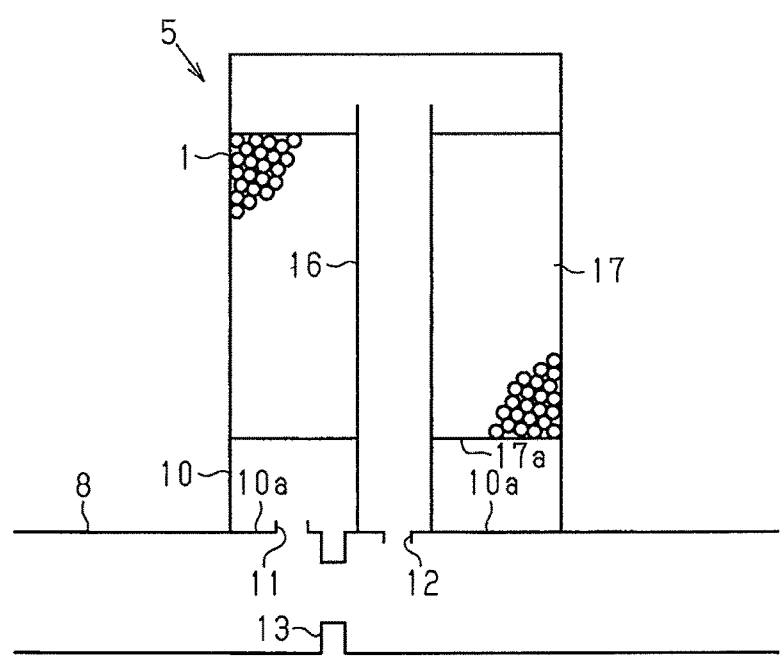
FIG. 2 is a diagram of the structure of the ion exchanger shown in FIG. 1.

As shown in FIG. 2, the ion exchanger 5 includes a case 10 with an inflow hole 11 into which a refrigerant flows and an outflow hole 12 out of which the refrigerant flows. The ion exchanger 5 further includes a refrigerant pipe 8, which is connected to the bypass pipe 6 (FIG. 1) and through which a refrigerant flows. The case 10 is tubular and has an upper end that is closed and a lower end that is formed integrally with the refrigerant pipe 8, which extends in the horizontal direction. The case 10 includes a partition wall 10*a* located between the case 10 and the refrigerant pipe 8. The inflow hole 11 and the outflow hole 12 extend through the partition wall 10*a*.

The case 10 accommodates a tube 16 extending in the vertical direction. The lower end of the tube 16 is in communication with the outflow hole 12 extending through the partition wall 10*a* of the case 10. The inflow hole 11, which communicates the refrigerant pipe 8 and the case 10, is located in the partition wall 10*a* at an upstream side of the outflow hole 12 in the direction in which the refrigerant flows in the refrigerant pipe 8 (direction from left toward right as viewed in FIG. 2). A reduced diameter portion 13 having a smaller refrigerant flow area than other portions of the refrigerant pipe 8 is located between the inflow hole 11 and the outflow hole 12 in the refrigerant pipe 8.

An ion exchange resin 17 that removes ions from the refrigerant is arranged in the ion exchanger 5 between an inner wall of the case 10 and an outer wall of the tube 16. The refrigerant in the cooling circuit 2 shown in FIG. 1 flows through the refrigerant pipe 8 of the ion exchanger 5 when passing through the bypass pipe 6. The refrigerant flowing through the refrigerant pipe 8 shown in FIG. 2 is separated into refrigerant that passes through the reduced diameter portion 13 and flows downstream and refrigerant that passes through the case 10 of the ion exchanger 5 instead of the reduced diameter portion 13 and flows toward the downstream side of the reduced diameter portion 13. In such a manner, the flow rate of the refrigerant passing through the case 10 is set by the size of the refrigerant flow area at the reduced diameter portion 13.

The refrigerant that flows through the inflow hole 11 into the case 10, instead of through the reduced diameter portion 13, passes through the ion exchange resin 17 from the lower side to the upper side. The ion exchange resin 17 removes ions from the refrigerant through ion exchange. After the ions are removed, the refrigerant flows out of the case 10 through the tube 16 and the outflow hole 12 into the refrigerant pipe 8. In the ion exchanger 5, it is preferred that the refrigerant in the case 10 pass through the ion exchange resin 17 as evenly as possible so that the ion exchange resin 17 efficiently removes ions from the refrigerant. The ion exchanger 5 of the present embodiment includes the inflow hole 11 in the case 10 to enable efficient ion removal.

The inflow hole 11 will now be described in detail.

Figure 3:
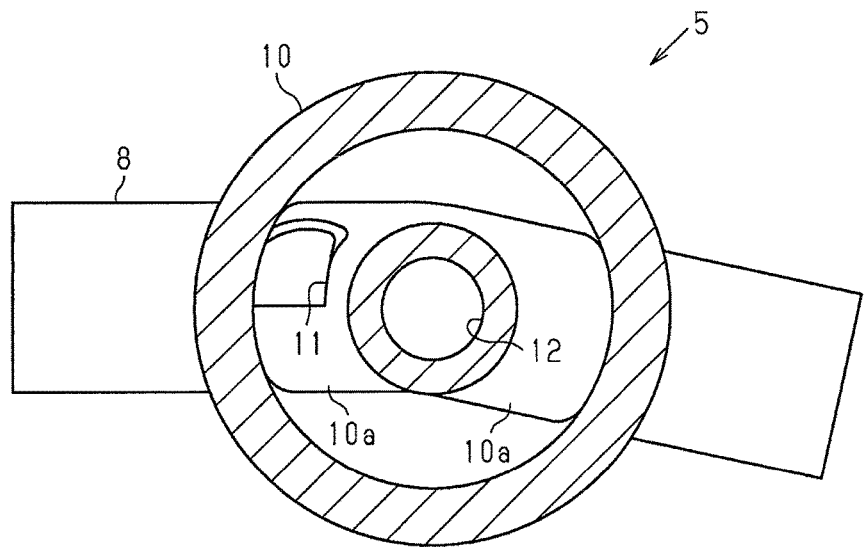
FIG. 3 is a cross-sectional plan view of an inflow hole of the ion exchanger shown in FIG. 2 as viewed from above.

FIG. 3 shows the inflow hole 11 as viewed from above. The inflow hole 11 is formed so that the refrigerant flows through the inflow hole 11 into the case 10 and evenly flows into the ion exchange resin 17 from a lower end surface 17*a* of the ion exchange resin 17 (FIG. 2). As shown in FIG. 3, the outflow hole 12 is located in the case 10 on the center line (center axis) of the case 10. The inflow hole 11 is located in the case 10 at the upstream side (left side in FIG. 3) of the outflow hole 12 in the refrigerant pipe 8. The inflow hole 11 is located adjacent to an inner circumferential surface of the case 10. The inflow hole 11 and the outflow hole 12 are formed when casting the case 10 and the refrigerant pipe 8.

Figure 4:
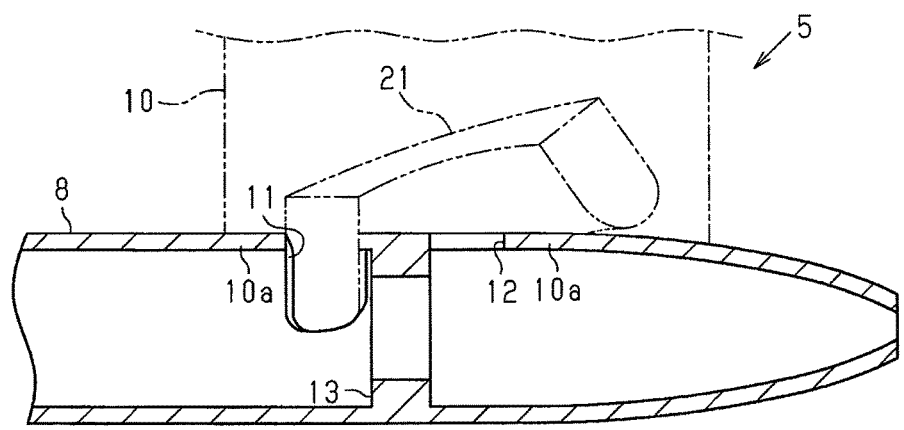
FIG. 4 is a cross-sectional side view showing the relationship of a hole formation portion of a mold, which is used to cast a case and a refrigerant pipe shown in FIG. 2, and the inflow hole of the refrigerant pipe.

As shown by the broken line in FIG. 4, a casting mold includes a hole formation portion 21 that forms the inflow hole 11. The inflow hole 11 is formed in the refrigerant pipe 8 when casting the case 10 and the refrigerant pipe 8 with the mold including the hole formation portion 21.

FIG. 5 shows the inflow hole 11 hypothetically extended into the case 10 with broken line L1. As shown by broken line L1, the extension extends spirally around the entire circumference of the tube 16 and leads to the outflow hole 12. That is, an opening of the inflow hole 11 in the case 10 is directed so that the extension shown by broken line L1 extends spirally around the entire circumference of the tube 16. For example, the axis of the opening of the inflow hole 11 in the case 10 is inclined to form the extension. In other words, the "opening of the inflow hole 11 in the case 10" is a portion of the partition wall 10*a* that defines the inflow hole 11 in the case 10.

The pitch P of the spiral of the extension shown by broken line L1 is set so that the extension does not intersect the partition wall 10*a* at a side of the tube 16 that is opposite to the opening of the inflow hole 11 in the case 10. That is, the opening of the inflow hole 11 in the case 10 is directed so that the pitch P of the spiral of the extension shown by broken line L1 is as described above.

The above indicates that the hole formation portion 21 (FIG. 4) used to form the inflow hole 11 is set in advance in the following manner in the casting mold for the case 10 and the refrigerant pipe 8. More specifically, the hole formation portion 21 is set in advance so that the extension of the formed inflow hole 11 (broken line L1 in FIG. 5) is spiral as described above.

Further, the height of the lower end surface 17*a* of the ion exchange resin 17 in the case 10 is set in advance so that the lower end surface 17*a* is located above the extension shown by broken line L1 where the extension extends once around the tube 16 from the initiating point that is the opening of the inflow hole 11.

The operation of the ion exchanger 5 including the inflow hole 11 will now be described.

In the ion exchanger 5, the refrigerant flows through the inflow hole 11 into the case 10 and spirally around the entire circumference of the tube 16. The spirally flowing refrigerant does not strike the partition wall 10*a* at the side of the tube 16 opposite to the opening of the inflow hole 11 in the case 10. The spirally flowing refrigerant moves once around the tube 16 without striking the lower end surface 17*a* of the ion exchange resin 17. As a result, a refrigerant layer that upwardly moves around the entire tube 16 is formed at the lower side of the lower end surface 17a of the ion exchange resin 17 in the case 10. The refrigerant layer flows into the ion exchange resin 17 evenly from the entire lower end surface 17a. This limits a biased flow of the refrigerant that passes through the ion exchange resin 17. Thus, the ion exchange resin 17 efficiently removes ions from the refrigerant.

Figure 6A:
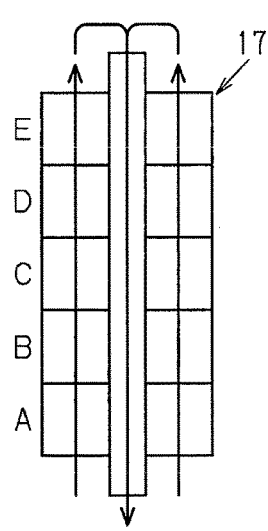
FIG. 6A is a diagram showing the ion exchange resin of FIG. 2 divided into regions A to E.
Figure 6B:
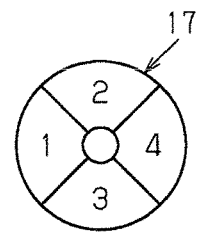
FIG. 6B is a diagram showing the ion exchange resin of FIG. 2 divided into regions 1 to 4.
Figure 7:
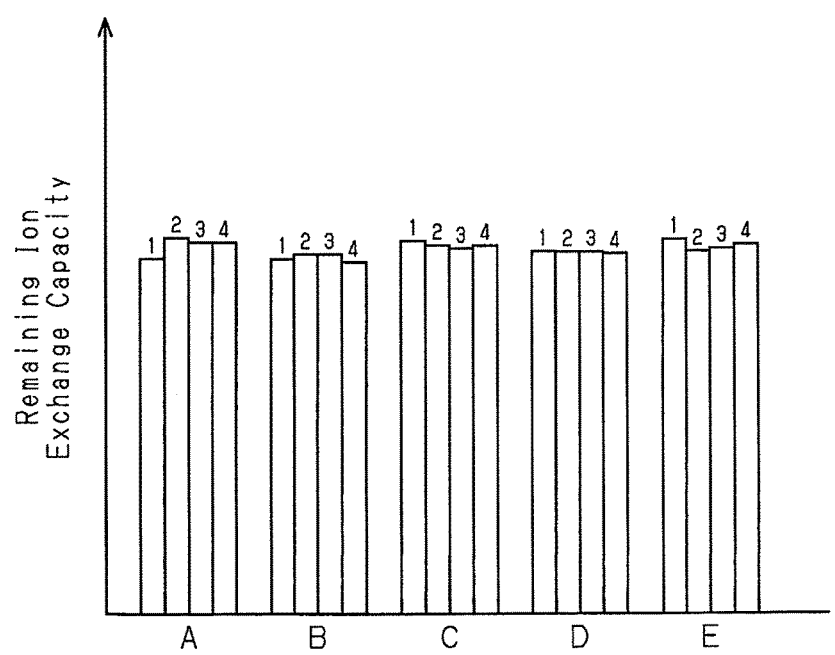
FIG. 7 is a graph of the remaining ion exchange capacity for each region of the ion exchange resin shown in FIG. 6A.

As shown in FIG. 6A, the ion exchange resin 17 of the ion exchanger 5 of the present embodiment is divided into region A, region B, region C, region D, and region E from the lower side toward the upper side. Further, as shown in FIG. 6B, each of the regions A to E is divided into region 1, region 2, region 3, and region 4. In this case, when the ion exchanger 5 is used over a predetermined period, the remaining ion exchange capacity of each of regions 1 to 4 of each of the regions A to E are as shown in FIG. 7. The remaining ion exchange capacity refers to the remaining exchangeable ion amount in regions 1 to 4 of each of the regions A to E, that is, the amount in which ion exchange has been performed over the predetermined period.

As shown in FIG. 7, the remaining ion exchange capacities are substantially equal in regions 1 to 4 of each of the regions A to E. This shows that there is no biased flow of the refrigerant passing through the ion exchange resin 17 in the ion exchanger 5 of the present embodiment and that ions are substantially evenly removed from the refrigerant through ion exchange in regions 1 to 4 of each of the regions A to E of the ion exchange resin 17. In other words, the ion exchange resin 17 efficiently removes ions from the refrigerant.

The present embodiment has the advantages described below.

(1) The ion exchange resin 17 efficiently removes ions from a refrigerant. This limits decreases in the ion removal efficiency of the ion exchanger 5 with the ion exchange resin 17 that would be caused when the ion exchange resin 17 does not efficiently remove ions from the refrigerant.

(2) The refrigerant flows through the inflow hole 11 into the case 10 and spirally around the entire circumference of the tube 16 without striking the lower end surface 17a of the ion exchange resin 17. As a result, a refrigerant layer that upwardly moves around the entire circumference of the tube 16 is formed at the lower side of the lower end surface 17a of the ion exchange resin 17. The refrigerant layer flows into the ion exchange resin 17 evenly from the entire lower end surface 17a. This limits a biased flow of the refrigerant that passes through the ion exchange resin 17.

(3) The refrigerant flowing from the inflow hole 11 into the case 10 does not strike the partition wall 10a at a side of the tube 16 opposite to the opening of the inflow hole 11 in the case 10. Thus, the partition wall 10a does not disturb the spiral flow of the refrigerant, and the refrigerant layer is formed without being hindered by such a disturbance.

(4) The refrigerant flows through the inflow hole 11 into the case 10 and spirally once around the tube 16 without striking the lower end surface 17a of the ion exchange resin 17. This limits situations in which the flow of the refrigerant locally strongly strikes the lower end surface 17a of the ion exchange resin 17 without forming a refrigerant layer. Thus, wear is avoided at portions in the lower end surface 17a of the ion exchange resin 17 where the flow of the refrigerant would strongly strike.

Second Embodiment

A second embodiment of an ion exchanger will now be described with reference to FIGS. 8 to 10.

Figure 8:
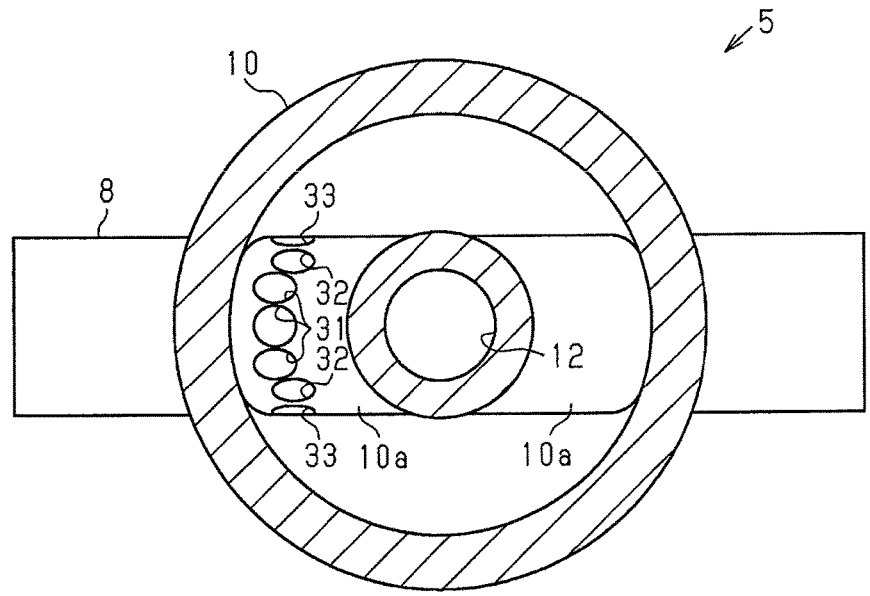
FIG. 8 is a cross-sectional plan view showing first inflow holes, second inflow holes, and third inflow holes of the ion exchanger as viewed from above.

As shown in FIG. 8, in this embodiment, first inflow holes 31, second inflow holes 32, and third inflow holes 33 are arranged in the circumferential direction of the refrigerant pipe 8 as inflow holes through which a refrigerant flows into the case 10. The refrigerant flows into the case from the first inflow holes 31, the second inflow holes 32, and the third inflow holes 33 so that the refrigerant in the case 10 passes through the ion exchange resin 17 as evenly as possible. The first inflow holes 31, the second inflow holes 32, and the third inflow holes 33 will now be described in detail.

There are three inflow holes 31, one extending in the same direction as the outflow hole 12 and two located at opposite sides of that inflow hole 31 in the circumferential direction of the refrigerant pipe 8. Two inflow holes 32 are arranged at the outer sides of the three first inflow holes 31 in the circumferential direction of the refrigerant pipe 8. Two inflow holes 33 are arranged at the outer sides of the two second inflow holes 32 in the circumferential direction of the refrigerant pipe 8. The first inflow hole 31 has a larger refrigerant flow area than the second inflow hole 32 and the third inflow hole 33.

Figure 9:
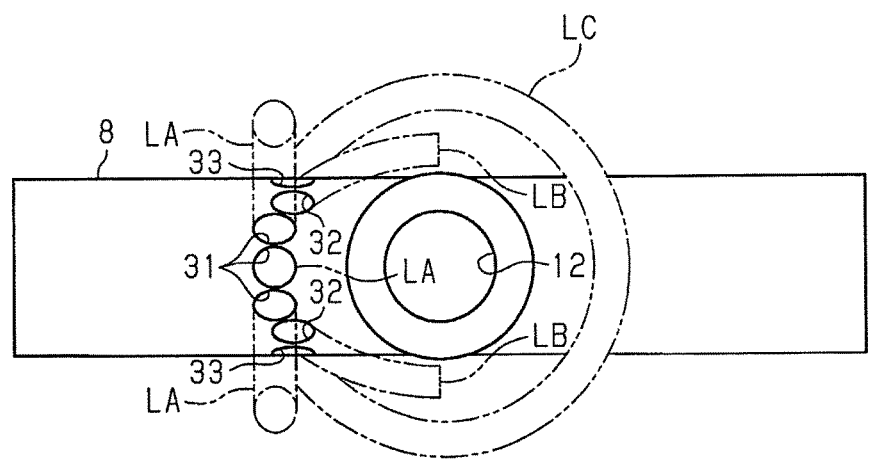
FIG. 9 is a plan view of extensions when hypothetically extending the first inflow holes, the second inflow holes, and the third inflow holes shown in FIG. 8 into the case.
Figure 10:
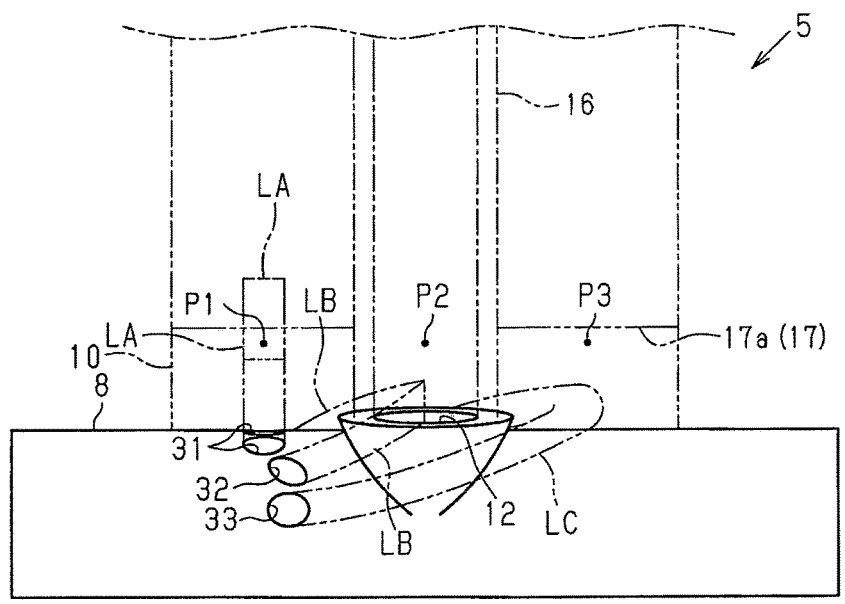
FIG. 10 is a side view of the extensions when hypothetically extending the first inflow holes, the second inflow holes, and the third inflow holes shown in FIG. 8 into the case.

FIGS. 9 and 10 show the first inflow holes 31 hypothetically extended into the case 10 with broken lines LA. Further, the second inflow holes 32 hypothetically extended into the case 10 are shown by broken lines LB, and the third inflow holes 33 hypothetically extended into the case 10 are shown by broken lines LC.

The extension shown by broken line LA that corresponds to the middle one of the first inflow holes 31 in the circumferential direction of the refrigerant pipe 8 is extended upwardly, and the extensions shown by broken lines LA that correspond to the other two of the three first inflow holes 31 at the two ends in the circumferential direction of the refrigerant pipe 8 are upwardly inclined in the circumferential direction. That is, the opening of each first inflow hole 31 in the case 10 is directed so that each of the extensions shown by broken lines LA extends in the manner described above. The axes of the openings of the first inflow holes 31 in the case 10 are, for example, inclined to form the extensions. In other words, the "openings of the first inflow holes 31 in the case 10" are portions of the partition wall 10a that define the first inflow holes 31 in the case 10.

As shown in FIG. 10, the extensions shown by broken line LC extend to a third position P3. The third position P3 and a first position P1 (FIG. 10) corresponding to the first inflow hole 31 are located at opposite sides of the tube 16 in a region below the lower end surface 17a of the ion exchange resin 17. That is, the opening of each third inflow hole 33 in the case 10 is directed so that each of the extensions shown by broken lines LC extends in the manner described above. For example, the axis of the opening of each third inflow hole 33 in the case 10 is inclined to form the extensions. In other words, the "openings of the third inflow holes 33 in the case 10" are portions of the partition wall 10a that define the third inflow holes 33 in the case 10.

As shown in FIG. 10, the extensions shown by broken line LB extend to a second position P2. The second position P2 is located between the first position P1 and the third position P3. That is, the opening of each second inflow hole 32 in the case 10 is directed so that each of the extensions shown by broken lines LB extends in the manner described above. For example, the axis of the opening of the second inflow hole 32 in the case 10 is inclined to form the extensions. In other words, the "openings of the second inflow holes 32 in the case 10" are portions of the partition wall 10a that define the second inflow hole 32 in the case 10.

The advantages of the ion exchanger 5 including the first inflow holes 31, the second inflow holes 32, and the third inflow holes 33 will now be described.

In the ion exchanger 5, refrigerant flows through the first inflow holes 31, the second inflow holes 32, and the third inflow holes 33 into the case 10 and toward the first position P1, the second position P2, and the third position P3 at the region below the lower end surface 17a of the ion exchange resin 17. As a result, a refrigerant layer that moves upwardly around the entire tube 16 is formed at the lower side of the lower end surface 17a of the ion exchange resin 17 in the case 10. The refrigerant layer flows into the ion exchange resin 17 evenly from the entire lower end surface 17a. This limits a biased flow of the refrigerant that passes through the ion exchange resin 17. Thus, the ion exchange resin 17 efficiently removes ions from the refrigerant.

In the ion exchanger 5, the refrigerant flows through the first inflow holes 31, the second inflow holes 32, and the third inflow holes 33 into the case 10 and in the refrigerant pipe 8 from the upstream side toward the downstream side, that is, from left to right in FIG. 10. Thus, among the positions P1, P2, and P3 located at the lower side of the lower end surface 17a of the ion exchange resin 17, the refrigerant that reaches the first position P1 is less than the refrigerant that reaches the second and third positions P2 and P3. However, the first inflow holes 31 have a larger refrigerant flow area than the third inflow holes 33 and the second inflow holes 32. This increases the amount of the refrigerant flowing toward the first position P1 and thus easily forms the refrigerant layer at the lower side of the lower end surface 17a of the ion exchange resin 17 in the case 10.

Other Embodiments

It should be apparent to those skilled in the art that the present invention may be embodied in many other specific forms without departing from the spirit or scope of the invention. Particularly, it should be understood that the present invention may be embodied in the following forms.

In the second embodiment, the number of each of the first inflow holes 31, the second inflow holes 32, and the third inflow holes 33 may be changed.

In the second embodiment, the first inflow hole 31 does not always need to have a larger refrigerant flow area than the second inflow hole 32 and the third inflow hole 33. That is, as long as the refrigerant layer is formed at the lower side of the lower end surface 17a of the ion exchange resin 17 in the case 10, the refrigerant flow area of the first inflow hole 31 may be larger than or equal to the refrigerant flow areas of the second inflow hole 32 and the third inflow hole 33.

In the first embodiment, the spiral flow of the refrigerant flowing from the inflow hole 11 into the case 10 does not always have to move once around the circumference of the tube 16. That is, as long as the refrigerant layer is formed at the lower side of the lower end surface 17a of the ion exchange resin 17 in the case 10, the refrigerant does not have to spirally flow once around the circumference of the tube 16.

The present examples and embodiments are to be considered as illustrative and not restrictive, and the invention is not to be limited to the details given herein, but may be modified within the scope and equivalence of the appended claims.

The invention claimed is:

1. An ion exchanger comprising:
   a case including an inflow hole into which a refrigerant flows and an outflow hole out of which the refrigerant flows; and
   an ion exchange resin arranged in the case to remove ions from the refrigerant, wherein
   the inflow hole and the outflow hole are located at a lower end of the case,
   the case accommodates a tube extending in a vertical direction and connecting to the outflow hole,
   the ion exchange resin is located between an inner wall of the case and an outer wall of the tube, and
   the inflow hole is formed so that the refrigerant flows through the inflow hole into the case and evenly into the ion exchange resin from a lower end surface of the ion exchange resin wherein the case is formed integrally with a refrigerant pipe through which the refrigerant flows, the refrigerant pipe extending in a horizontal direction, the case includes a partition wall located between the case and the refrigerant pipe, the outflow hole is located in the partition wall and communicates the refrigerant pipe and the tube, the inflow hole is located at an upstream side of the outflow hole in the partition wall in a flow direction of the refrigerant in the refrigerant pipe and communicates the refrigerant pipe and the case, and an opening of the inflow hole in the case is structured and arranged to direct refrigerant flow along a flow path that, spirally extends outside of the tube around an entire circumference of the tube.

2. The ion exchanger according to claim 1, wherein
   the opening of the inflow hole in the case is directed so that the flow path extends spirally with a pitch that avoids intersecting of the flow path with the partition wall at a position located at a side of the tube opposite to the opening, and
   the lower end surface of the ion exchange resin in the case is located at a height above the flow path where the flow path extends once around the tube from an initiating point that is the opening of the inflow hole.

3. The ion exchanger according to claim 1, wherein the outflow hole is arranged within a circumference defined by the tube at a terminal end of the tube.

* * * * *